United States Patent [19]

Lin

[11] Patent Number: 4,958,532
[45] Date of Patent: Sep. 25, 1990

[54] DOUBLE ACTION BRAKE HANDLE STRUCTURE

[76] Inventor: A Ping Lin, 4-5, Shih Pai Village, Chang Hwa City, Chang Hwa County, Taiwan

[21] Appl. No.: 343,793

[22] Filed: Apr. 27, 1989

[51] Int. Cl.⁵ ............................................. G05G 11/00
[52] U.S. Cl. ...................................... 74/489; 74/502.2
[58] Field of Search ...................... 74/488, 489, 502.2, 74/526, 527, 501.6, 523, 551.8, 558.5, 501.5 R; 188/2 D, 24.18, 24.19, 24.22

[56] References Cited

U.S. PATENT DOCUMENTS

| | | | |
|---|---|---|---|
| 4,088,040 | 5/1978 | Ross-Myring | 74/501.5 R |
| 4,188,834 | 2/1980 | Wakatsuki et al. | 74/489 |
| 4,193,318 | 3/1980 | Golobay | 74/501.5 R |
| 4,263,818 | 4/1981 | Ozaki | 74/526 X |
| 4,611,500 | 9/1986 | Nagano | 74/489 |
| 4,637,273 | 1/1987 | Nagano | 74/558.5 X |
| 4,819,497 | 4/1989 | Romano | 74/489 |

FOREIGN PATENT DOCUMENTS 138703  1/1953  Sweden ............................. 74/502.2

Primary Examiner—Vinh T. Luong
Attorney, Agent, or Firm—Birch, Stewart, Kolasch & Birch

[57] ABSTRACT

A double action brake handle structure is provided which includes a cam surface on a brake handle and a roller mounted on a brake cable retainer. The cam surface bears on the roller upon actuation of the brake handle in order to give the brake cable greater movement so that the brake handle need be depressed only one half of the distance normally required.

1 Claim, 5 Drawing Sheets

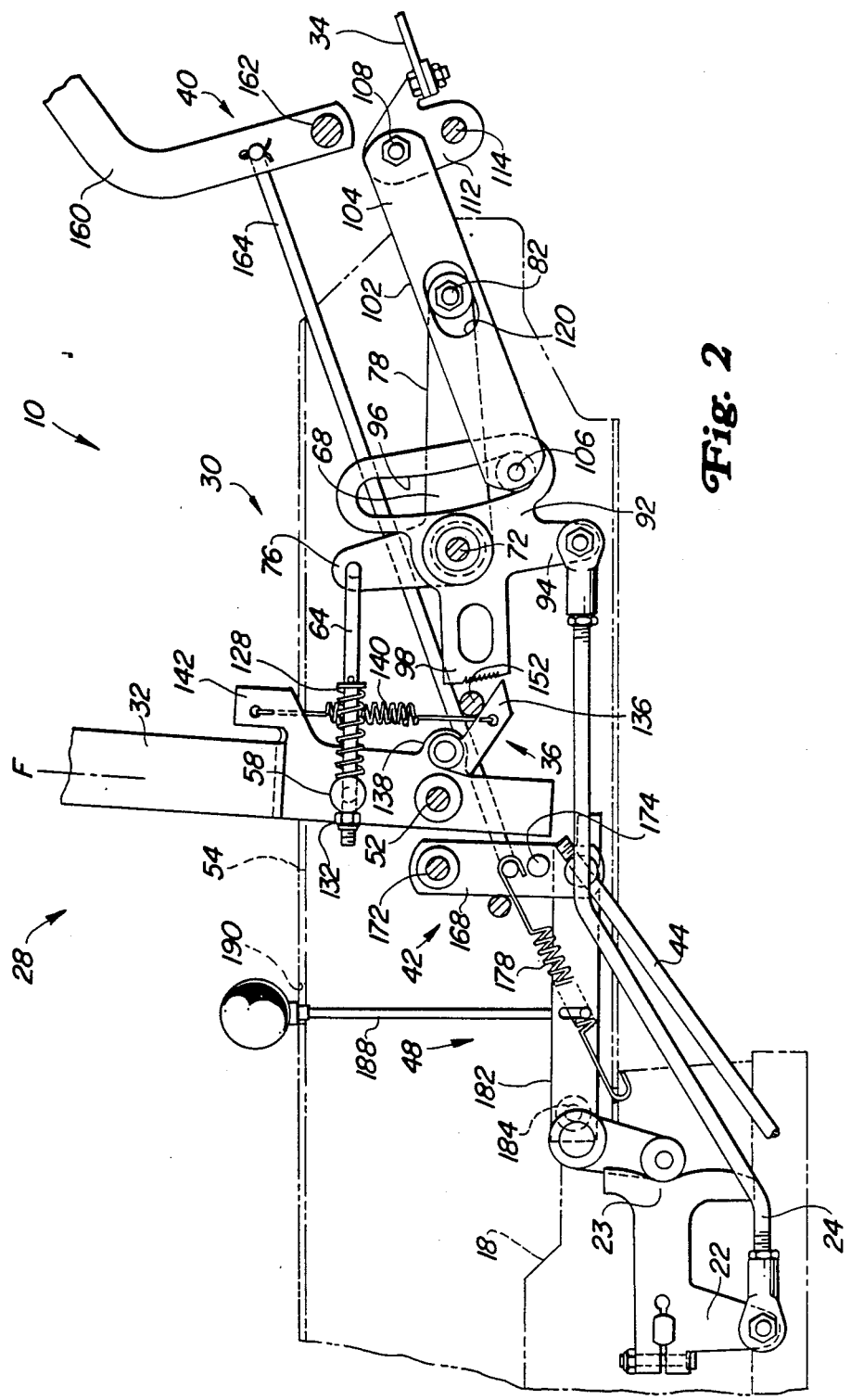

4,958,532

DOUBLE ACTION BRAKE HANDLE STRUCTURE

BACKGROUND OF THE INVENTION

1. Field of the Invention

The present invention relates to a double action brake handle structure, and more particularly to a special brake handle that when used for braking, the cable retainer and brake handle rotate simultaneously in the opposite direction. In this way, the distance through which the brake cable is pulled out for a given distance of brake handle movement is greater than in a conventional braking system.

2. Description of the Prior Art

Conventional brake handle structures, though found in a great variety, usually conform in structure with the drawing in FIG. 1. Such handle includes a handle bar 1 and a brake cable retainer 2 which are linked together by a pivot which can be a nut and a bolt or a rivet. The brake cable retainer 2 is fixed to chassis 5 by fixing mount 4. The brake cable retainer 2 has a hole through which the brake cable guide 6 is fixed. The brake cable end 7 is fixed in a recess in the brake cable handle 1.

When the brake handle 1 is depressed, it rotates about the pivot 3, and thereby pulls the brake cable 7. The displacement of the brake cable end 7 is transmitted to the opposite end of the brake, thereby actuating the brake mechanism. In conventional brake handle structure, the brake cable retainer 2 is tightly held in position with the chassis 5, preventing any rotary or translatory motion between the two. Thus the distance through which the brake cable end 7 is pulled, is limited by the distance between brake handle 1 and the chassis 5. As the brake handle 1 is depressed through yet greater distances, the brake cable 7 will be pulled through yet greater distances. The brake's life is also extended when the brake handle 7 is depressed over greater distances, as this results in less slippage and hence reduced wear on the brake pads.

The space between the handle bar 1 and chassis 5 cannot be made arbitrarily as a limit will be reached where the user's hands will no longer be able to accommodate the distance. Therefore conventional brake handle structures are limited in the distance through which their brake cables can be pulled.

SUMMARY OF THE INVENTION

The main object of the present invention is to provide a special brake handle structure than can increase the displacement of the brake cable when pulled out, without increasing the relative distance between the handle bar and chassis. This is accomplished by providing a double action brake handle structure comprising a mount which can be secured to a chassis and has an inner hole and at least an outer hole. A brake cable retainer having at least a front hole and rear hole is provided. A brake handle with a front recess for securing a brake cable end also provides a cam surface at the rear. A fastener connects the brake cable retainer to the mount through the rear hole in the brake cable retainer and the inner hole on the mount and allows the brake cable retainer to rotate relative to the fixed mount. An additional fastener connects the brake handle to the mount through the hole in the brake handle and the outer hole of the mount and allows the brake handle to rotate relative to the mount. A roller is held concentrically and axially with the front hole of the brake cable retainer by means of another fastener and is kept in contact with the cam surface of the brake handle, so when the brake handle is depressed, the brake cable retainer will be caused to rotate in the opposite direction.

DESCRIPTION OF THE PREFERRED EMBODIMENT

Figure 1:
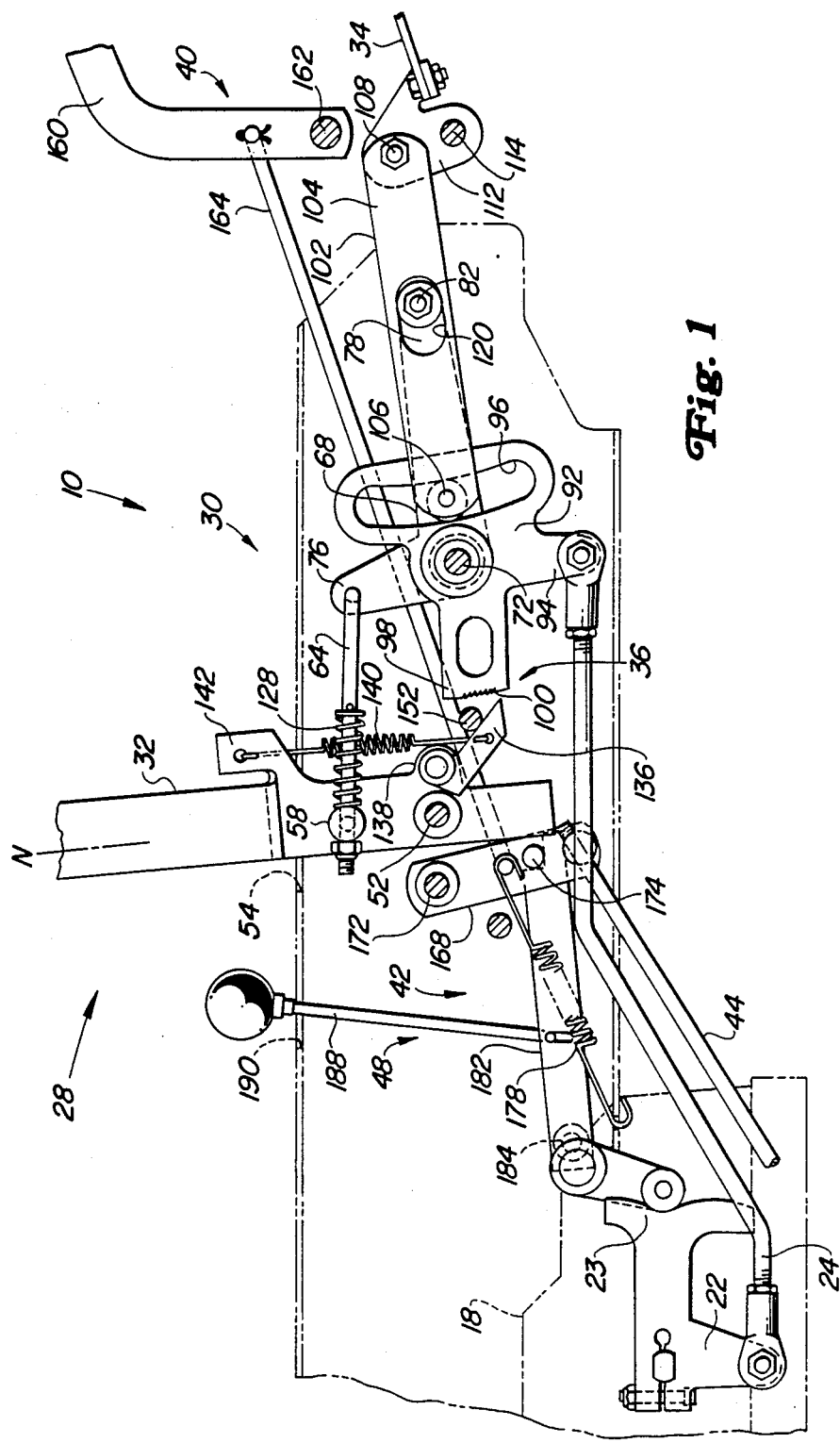
FIG. 1 is a plan view of conventional brake handle structure.
Figure 3:
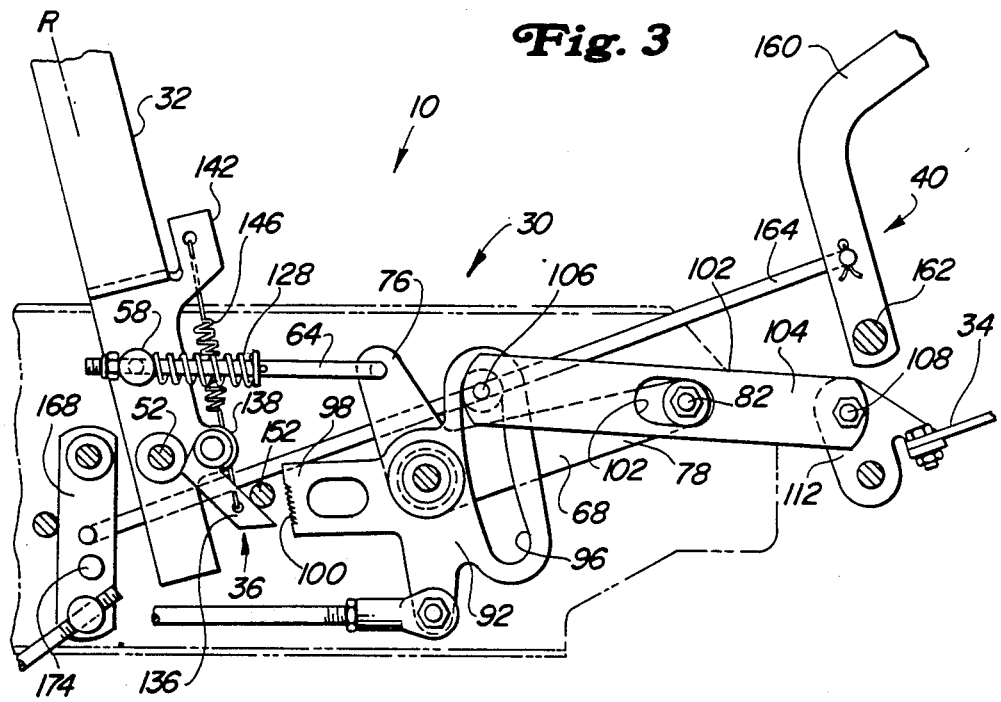
FIG. 3 is a plan view partly in section of the brake handle structure according to the above preferred embodiment of the present invention.
Figure 2:
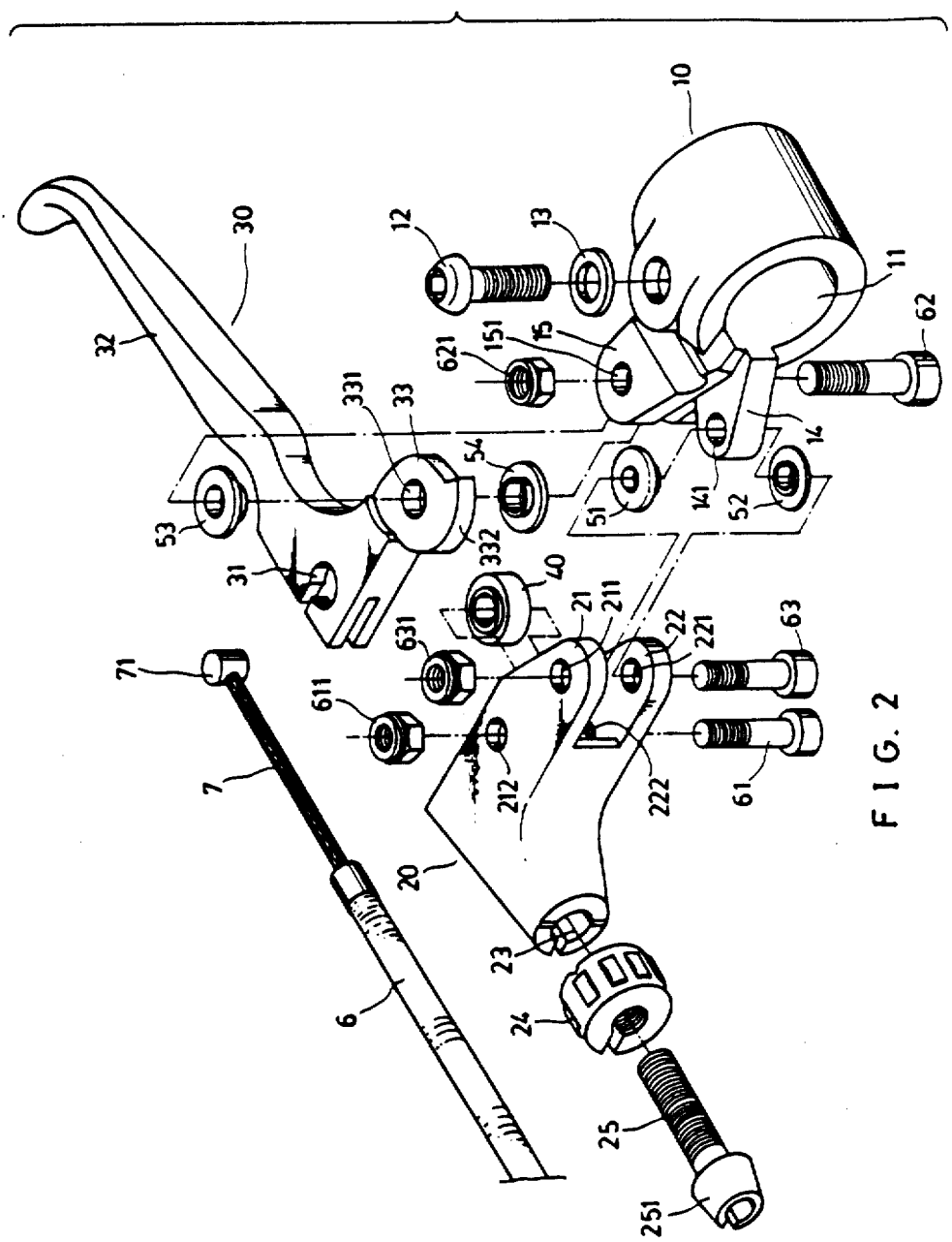
FIG. 2 is an exploded perspective view of the brake handle structure according to a preferred embodiment of the present invention.
Figure 3:
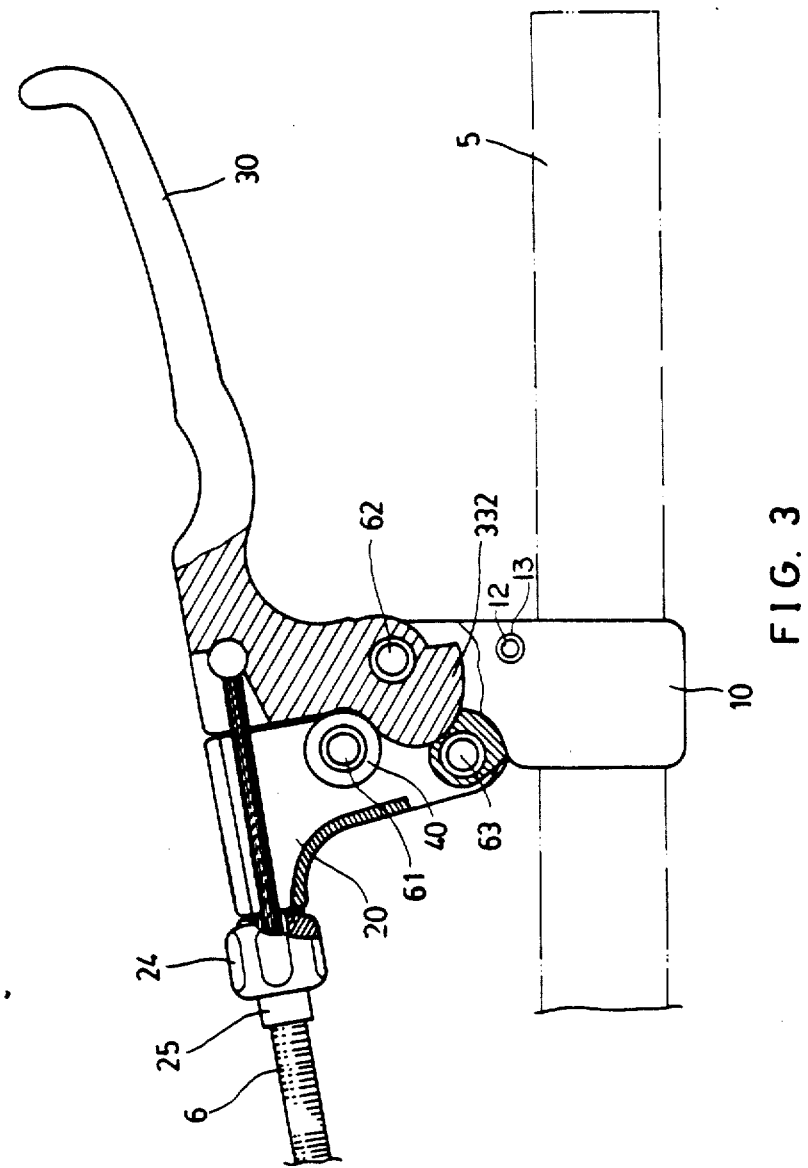
Figure 4:
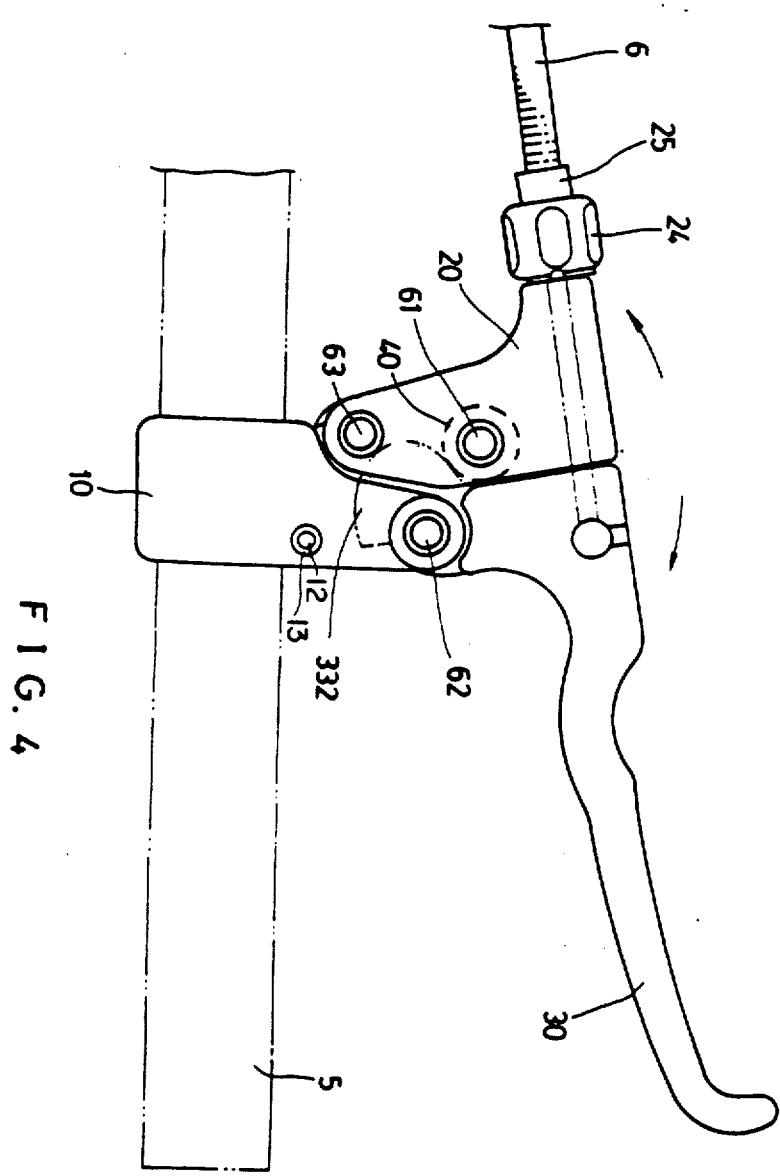

Referring to FIGS. 2 and 3, a mount 10 is provided which has a cylindrical inner surface to receive chassis 5. The mount 10 is firmly secured to the chassis 5 by fasteners, such as bolt 12 and washer 13. An inner appendage or arm 14 having a hole 141 extends from the mount 10. In addition, two outer appendages or arms 15 having concentric axial holes 151 with the same diameter extend from the mount 10.

The brake cable retainer 20 has two protruding appendages or arms 21 and 22, with two concentric axial holes 211 and 221 with the same diameter being provided. Holes 211 and 221 in arms 21 and 22 respectively ar aligned with hole 141 of arm 14 by means of a bolt 63 which passes through the holes and is secured by nut 631. Bearing surfaces 51 and 52 are also provided so that a pivot is formed by which the brake cable retainer 20 can rotate relative to the mount 10.

The brake cable retainer is also provided with two concentric axial holes 212 and 222. A roller 40 is held in place between holes 212 and 222 by means of a bolt 61 and nut 611. The brake cable retainer 20 is also provided with a slotted hole 23 which, along with the adjustable collar 24 and hollow screw 25, forms a housing for brake cable 7.

The end of brake cable guide 6 is locked to the endpiece of the hollow screw 25. The end member 71 on the end of the brake cable 7 is held in place by recess 31 located in the brake handle 30. The grip 32 on the brake handle 30 and the recess 31 are similar to those found in conventional brake handle structure. However, the present invention additionally provides a platekike portion 33 which extends into the brake cable retainer and has a central hole 331 together with a cam surface formed on its periphery.

The brake handle 30 is linked to the mount 10 by inserting the platelike portion 33 between the two arms 15 and holding the platelike portion 33 in place by bolt 62 and nut 621. Bearing discs 53 and 54 are provided. Thus, a pivot is formed and is so located that the cam surface 332 is always in contact with the roller 40.

Figure 4:
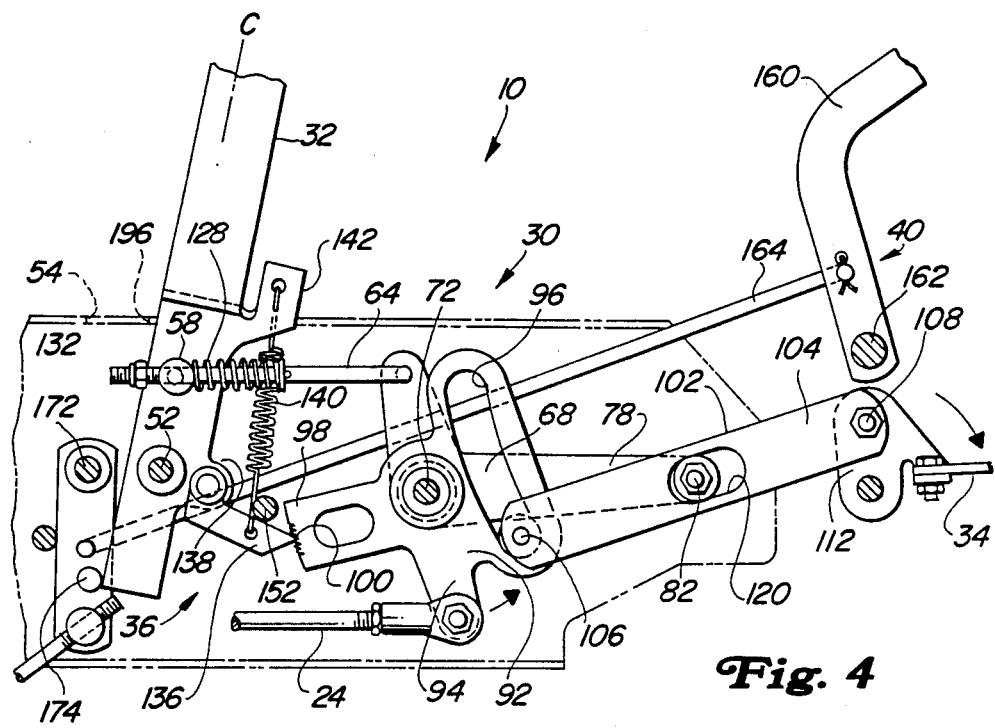
FIG. 4 and 5 are plan views illustrative of the brake handle structure operation according to the above preferred embodiment of the present invention.
Figure 1:
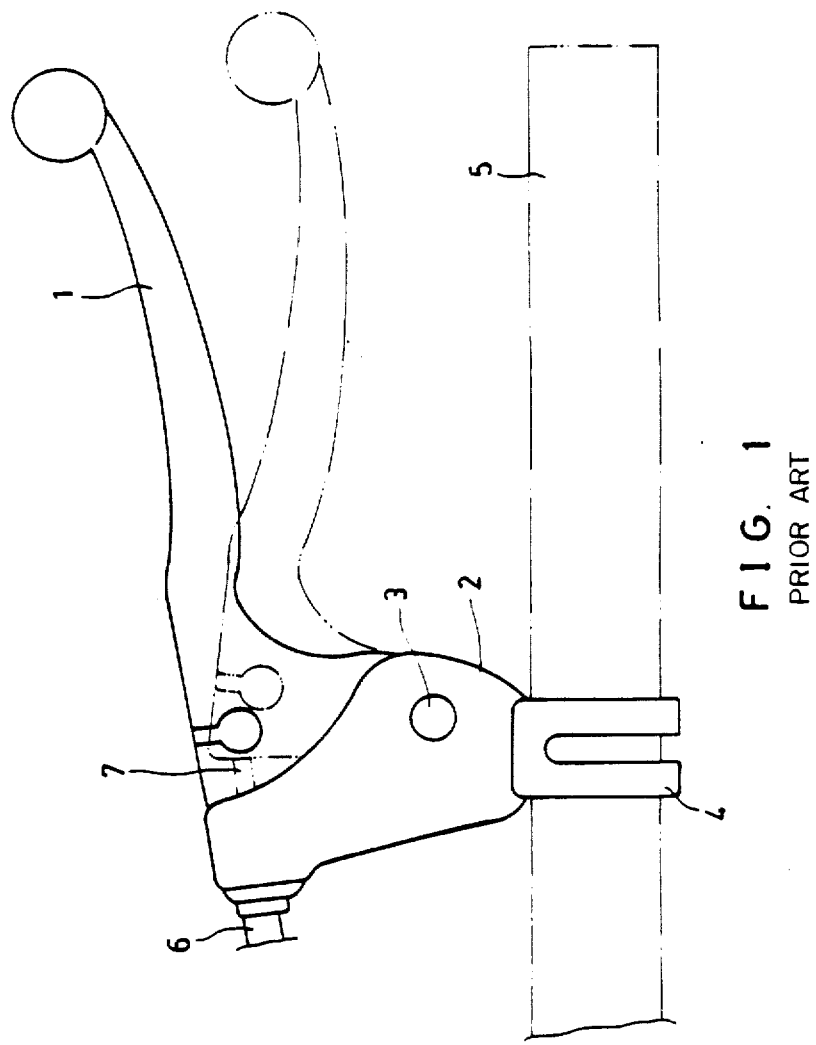
Figure 5:
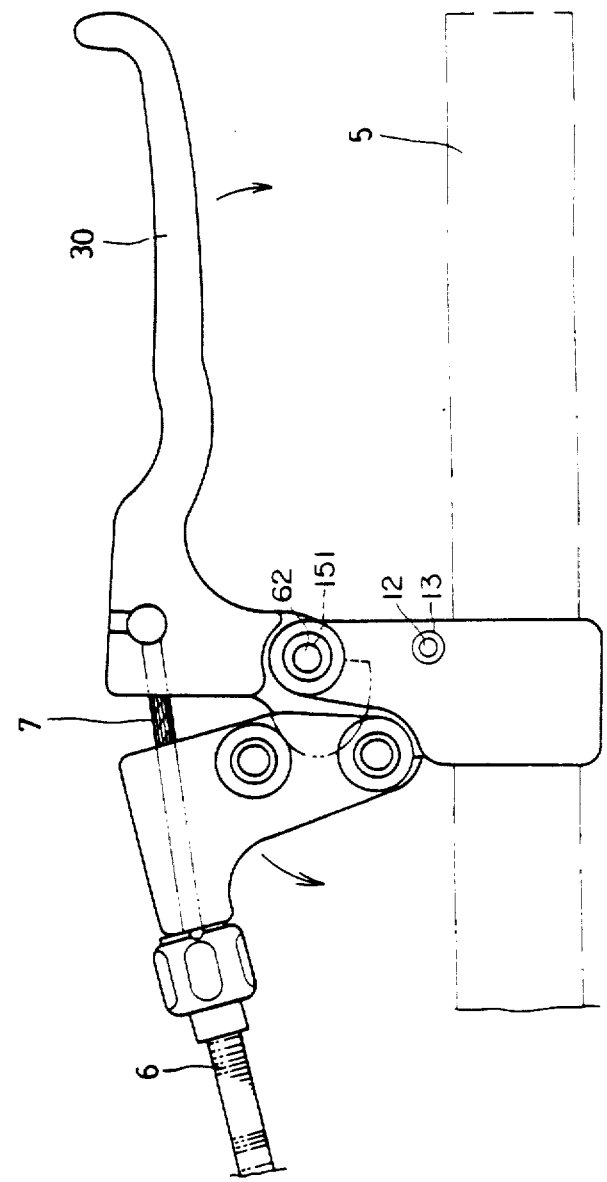

Referring to the action illustrated in FIGS. 4 and 5, before the user has depressed the brake handle 30, the two adjacent surfaces of the brake handle 30 and the brake cable retainer 20 are in contact, also the cam surface 332 and the roller 40 are in contact, as can be seen in their dotted line drawings in FIG. 4. When the user depresses the brake handle 30, the brake handle 30 rotates clockwise about the bolt 62 which acts as a pivot. The brake cable retainer 20 rotates counterclockwise about the bolt 63 which acts as a pivot, by means of the action of the cam surface 332 on the roller 40. The distance through which the brake cable 7 is extended is equal to the sum of the arc length, of the displacement of the brake cable termination point when the brake handle 30 rotates clockwise about the bolt 62, and the arc length of the displacement of a datum point defined by the intersection of the brake cable 7 and the mating surface of the brake cable retainer 20, when the brake cable retainer 20 undergoes counterclockwise rotation about the bolt 63 acting as a pivot.

By this means, then the brake handle 30 is depressed, the distance through which the brake cable 7 is pulled out is approximately twice that of the length extension in conventional brake handle structures. By the means of the double action brake handle structure, the wear on he brake pads is reduced, thereby prolonging the useful life of the braking system as compared with conventional brake handle structures. Moreover, as compared to conventional brake structures, for equal brake cable extension, the brake handle need only be depressed to approximately one half to distance. Thus the user's hands suffer less fatigue.

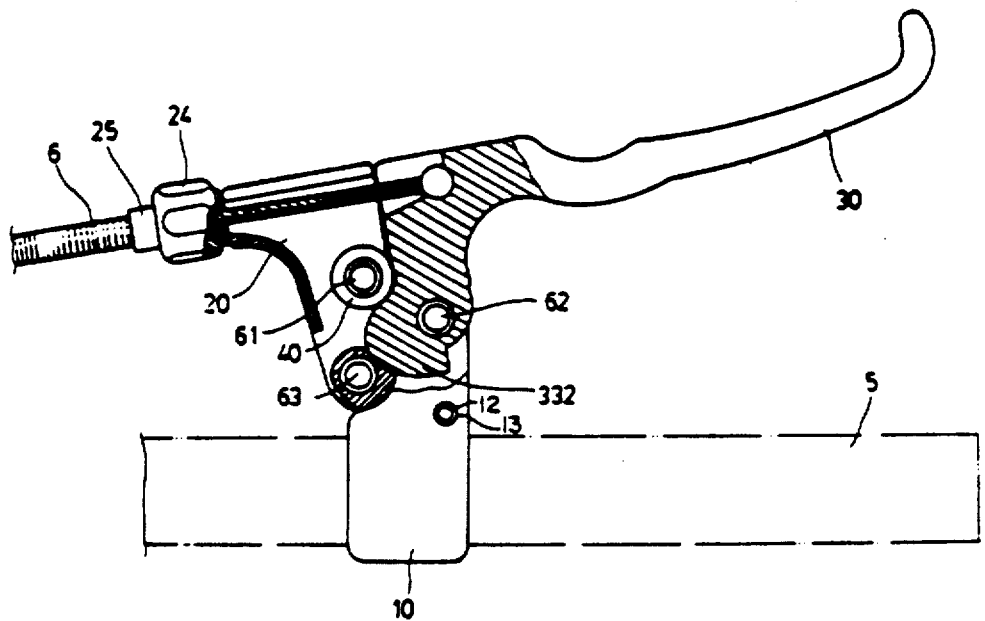

I claim:

1. A double action brake handle comprising
   a mount adapted to be positioned on a chassis,
   said mount including an inner hole therein and an outer hole therein,
   a brake cable retainer having a first hole and a second hole therein,
   a brake handle having a front recess for securing a brake cable end member, a cam surface thereon, and a hole therethrough,
   a first fastener means connecting said brake cable retainer to said mount through said first hole on said brake cable retainer and said inner hole of said mount and allowing said brake cable retainer to rotate relative to said mount,
   a second fastener means connecting said brake handle to said mount through said hole of said brake handle and said outer hole of said mount and allowing said brake handle to rotate relative to said mount,
   a third fastener means holding a roller concentrically and axially with said second hole of said brake cable retainer and in contact with said cam surface of said brake handle, and
   said cam surface being configured so that when said brake handle is depressed, said brake cable retainer will be caused to rotate in the opposite direction.

* * * * *

UNITED STATES PATENT AND TRADEMARK OFFICE
CERTIFICATE OF CORRECTION

PATENT NO. : 4,958,532

DATED : September 25, 1990

INVENTOR(S) : A. Ping Lin

It is certified that error appears in the above-identified patent and that said Letters Patent is hereby corrected as shown below:

The title page showing the illustrative figure should be deleted to be replaced with the attached title page.

Sheets 1-3 of the drawings should be deleted to be replaced with Sheets 1-5 of drawings, consisting of Figs. 1-5, as shown on the attached pages.

Signed and Sealed this

Eleventh Day of August, 1992

Attest:

DOUGLAS B. COMER

*Attesting Officer*  *Acting Commissioner of Patents and Trademarks*

United States Patent [19]

Lin

[11] Patent Number: 4,958,532
[45] Date of Patent: Sep. 25, 1990

[54] DOUBLE ACTION BRAKE HANDLE STRUCTURE

[76] Inventor: A Ping Lin, 4-5, Shih Pai Village, Chang Hwa City, Chang Hwa County, Taiwan

[21] Appl. No.: 343,793
[22] Filed: Apr. 27, 1989
[51] Int. Cl.⁵ ............................................. G05G 11/00
[52] U.S. Cl. ................................... 74/489; 74/502.2
[58] Field of Search ............... 74/488, 489, 502.2, 74/526, 527, 501.6, 523, 551.8, 558.5, 501 R; 188/2 D, 24.18, 24.19, 24.22

[56] References Cited

U.S. PATENT DOCUMENTS

| | | | |
|---|---|---|---|
| 4,088,040 | 5/1978 | Ross-Myring | 74/501.5 R |
| 4,188,834 | 2/1980 | Wakatsuki et al. | 74/489 |
| 4,193,318 | 3/1980 | Golobay | 74/501.5 R |
| 4,263,818 | 4/1981 | Ozaki | 74/526 X |
| 4,611,500 | 9/1986 | Nagano | 74/489 |
| 4,637,273 | 1/1987 | Nagano | 74/558.5 X |
| 4,819,497 | 4/1989 | Romano | 74/489 |

FOREIGN PATENT DOCUMENTS 138703 1/1953 Sweden ................... 74/502.2

Primary Examiner—Vinh T. Luong
Attorney, Agent, or Firm—Birch, Stewart, Kolasch & Birch

[57] ABSTRACT

A double action brake handle structure is provided which includes a cam surface on a brake handle and a roller mounted on a brake cable retainer. The cam surface bears on the roller upon actuation of the brake handle in order to give the brake cable greater movement so that the brake handle need be depressed only one half of the distance normally required.

1 Claim, 5 Drawing Sheets